United States Patent [19]

Halff et al.

[11] Patent Number: 5,082,564
[45] Date of Patent: Jan. 21, 1992

[54] METHOD AND MEANS FOR DESALINATION OF SEAWATER AND BRACKISH WATER

[76] Inventors: Albert H. Halff, 3514 Rock Creek Dr., Dallas, Tex. 75225; Allen F. Reid, 4736 Reservoir Rd., Geneseo, N.Y. 14454

[21] Appl. No.: 643,261

[22] Filed: Jan. 22, 1991

[51] Int. Cl.$^5$ ............................................... C02F 1/44
[52] U.S. Cl. ..................................... 210/638; 210/644; 210/321.78
[58] Field of Search ............ 210/638, 642, 644, 321.78

[56] References Cited

U.S. PATENT DOCUMENTS 3,357,917  12/1967  Humphreys ...................... 210/642
3,532,621  10/1970  Hough ............................. 210/648 X
3,670,897  6/1972   Frank .............................. 210/642 X Primary Examiner—Frank Spear
Attorney, Agent, or Firm—Stoll, Previto & Hoffman

[57] ABSTRACT

The method and mechanism for desalinating seawater and brackish water in which saline water is divided into inside and outside streams. The inside stream is moved through the inside of a transport membrane. The outside stream moves across the outside of the membrane. Ions cross the membrane from one stream to another and more ions are moved from the inside stream to the outside stream than are moved from the outside stream to the inside stream. The process is powered by an Na,K-pump in which Na$^+$ ions are moved from the inside stream to the outside stream and K$^+$ ions move in the opposite direction. After the inside stream leaves the transport membrane, the K$^+$ ions are replaced by Na$^+$ ions by a suitable ion exchanger.

28 Claims, 1 Drawing Sheet

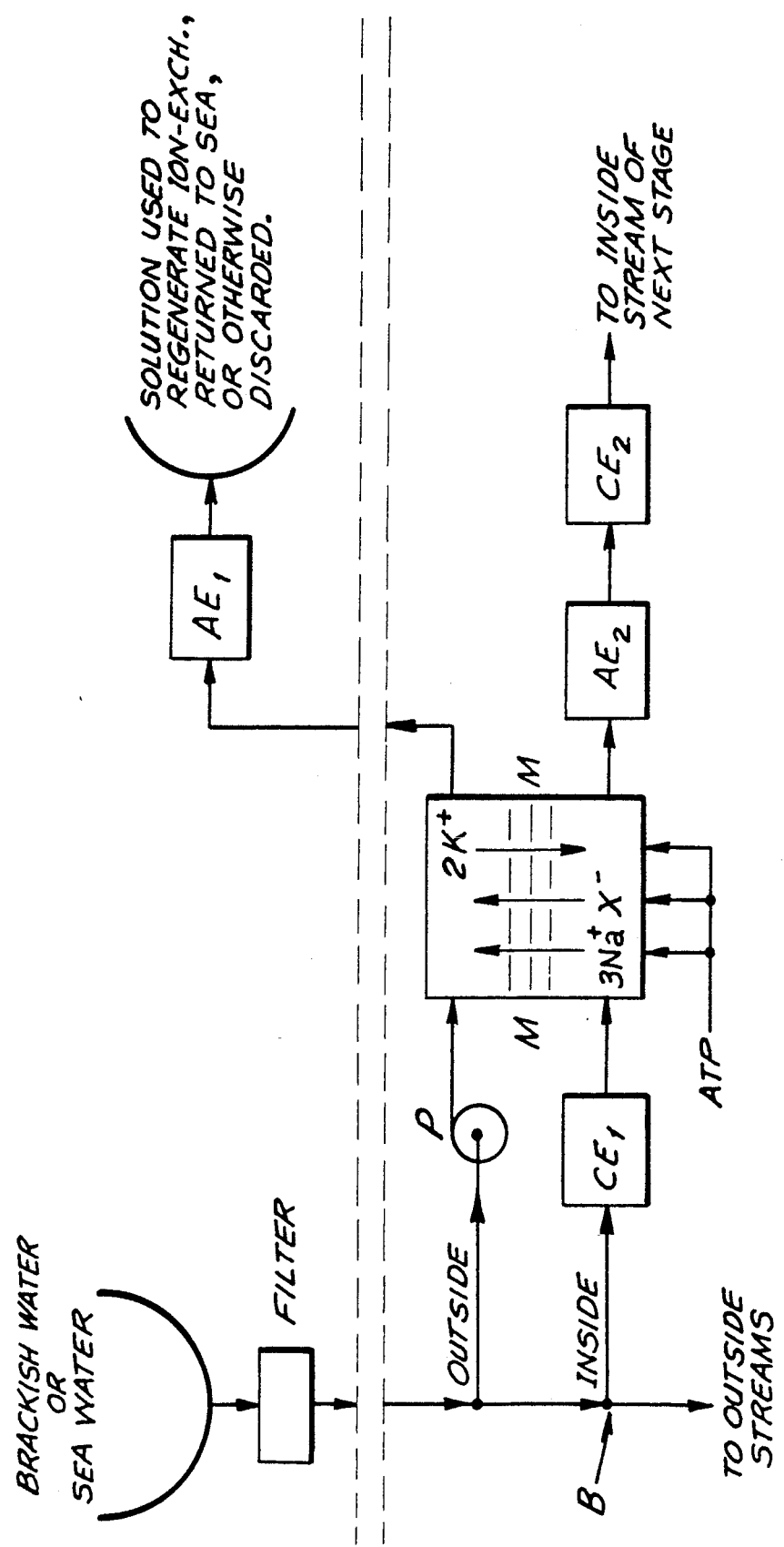

5,082,564

METHOD AND MEANS FOR DESALINATION OF SEAWATER AND BRACKISH WATER

BACKGROUND

The present invention relates to desalination of seawater and brackish water and more particularly to an improved method and means of desalinating seawater and brackish water which utilizes an enzyme assisted membrane.

Water usage has been increasing yearly so that the demand for fresh water for municipal, industrial, and agricultural use has been growing. In some areas lower than normal rainfall has forced authorities to place restrictions on water consumption. Because of an abundance of salt water, researchers have been studying various possibilities of obtaining fresh water from salt water. Various methods of desalination of water have been used over the years. However, none of these methods appear to be satisfactory.

BRIEF DESCRIPTION

The present invention has for one of its objects an improved desalination method which uses a transport membrane to achieve excellent results.

Another object of the present invention is the provision of an improved desalination method in which the transport of ions across the membrane is sufficient for the replacement of more ions in one direction than in the other direction.

Another object of the present invention is the provision of an improved desalination method in which a transport membrane is used to permit more ions to be moved in one direction than in the other direction.

Another object of the present invention is the provision of an improved desalination method in which a transport membrane and ion exchangers are used to achieve excellent results.

Other and further objects of the invention will be obvious upon an understanding of the illustrative embodiment about to be described, or will be indicated in the appended claims and various advantages not referred to herein will occur to one skilled in the art upon employment of the invention in practice.

The present invention accomplishes these objects by using the enzyme assisted transport of ions across a membrane against a concentration gradient, i.e., from a lower concentration to a higher one. The transport is powered through a chemical reaction, specifically the hydrolysis of ATP (adenosine 5'-triphosphate) to ADP (adenosine 5'-diphosphate) and $P_i$ (inorganic phosphate). The preferred enzyme is designated $Na^+,K^+$-ATPase because its most common action is catalyzing the hydrolysis of ATP in powering the transport of $Na^+$ ions from inside an animal cell across the cell membrane to outside the cell, almost simultaneous with transporting $K^+$ ions from outside to inside. The biochemical equipment for this activity is known as the "sodium pump" or, more precisely, as the Na,K-pump.

The process utilizes (1) the Na,K-pump to transport $Na^+$ ions with accompanying anions from water to be desalinated to a solution which may be discarded, and (2) ion exchangers to exchange other cations for $Na^+$ which can then be removed from the water by the Na,K-pump. The method of the present invention is very efficient because the number of cations transported by the pump from inside to outside the membrane is substantially greater than the number brought back; whereas, ion exchangers exchange different species with the same charge one-for-one.

DRAWINGS

A preferred embodiment of the invention has been chosen for purposes of illustration and description and is shown in the accompanying drawing forming a part of the specification, wherein:

The single drawing FIGURE shows a schematic simplified plan view of the process of the present invention.

The following legend on the drawing will be useful in explaining the process of the present invention:

P—Pump to increase pressure to compensate for increased osmotic pressure from inside stream.
M—Na,K-pump membrane.
AE—Anion exchangers:
  $AE_1$—$P_i$ removed and replaced by other anions.
  $AE_2$—ADP removed and replaced by other anions.
CE—Cation exchangers:
  $CE_1$—Other cations removed and replaced by $Na^+$ only for stage 1.
  $CE_2$—$K^+$ removed and replaced by $Na^+$.
B—Connection for inside stream of stage 1. For other stages, inside stream is from outflow of previous stage.

At final stage for very pure water: in $AE_2$, anions are replaced by $OH^-$; and, in $CE_2$, cations are replaced by $H^+$.

DESCRIPTION

The process of the present invention utilizes the following ingredients:

1. $Na^+,K^+$-ATPase (Na,K-ATPase) which is found in cell membranes of mammals and many other animals. It may be extracted from the membranes, purified, and reestablished in manufactured lipid membranes with substantially the same activity as in the original membrane. Different species of Na,K-ATPase are found in different tissues.

2. The Na,K-ATPase must be placed in a membrane with necessary lipids, and must be oriented so that the major $Na^+$ activation affinity is on one side of the membrane (like the inside of a cell), and the major $K^+$ activation affinity is on the other (like the outside of a cell). The membrane must be strong enough to withstand the extra pressure exerted by the less concentrated solution and must be "tight" enough to adequately reduce ordinary diffusion from one side to the other of cations and water.

3. The most efficient cell activity of the Na,K-pump, powered by hydrolysis of ATP, is

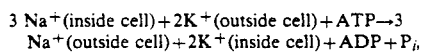

in which both $Na^+$ and $K^+$ are moved from lower to higher concentrations. The Na,K-pump transport of 3 $Na^+$ "out" coupled to $K^+$ "in" is utilized because it transports $Na+$ much faster than other Na,K-pump arrangements. Other Na,K-pump reactions, in which other monovalent ions are substituted for $K^+$ in its transport from outside to inside, are slower or less efficient.

4. ATP is the vehicle most used for transferring energy from biologic fuels to produce biochemical activity. It is available commercially, being used to inhibit enzymatic browning of raw edible plant materials, such as sliced apples, potatoes, etc. It can be synthesized or extracted from organic tissues. Energetically, upon hydrolysis $$ATP \longrightarrow ADP + P_i + 7300 \text{ calories (8.5 watt-hours)}.$$

5. Ion exchangers, either granular or membrane, can remove ions from a solution while giving to the solution other ions of the same charge. Ion exchangers are anionic or cationic, either naturally occurring or manufactured and they are available for many specialized exchange uses.

Referring to the drawing, seawater or brackish water is brought to the plant reservoirs. It is filtered and the flow of the filtered water is divided into two streams labeled "outside" and "inside". The "inside" stream is to be desalinated. The "outside" stream is a vehicle to remove substances rejected from the inside stream. It may also be the same as a source of $K^+$ for the Na,K-pump operation, or possibly, as a source of ions for regeneration of ion exchangers.

The cation concentration of seawater is approximately: $Na^+$, 460 mM (millimolar); $K^+$, 10 mM; $Mg^{++}$, 52 mM; and other cations to total an equivalence of 590 to 600 mM.

The inside stream first enters a cation exchanger $CE_1$ where most of the cations other than $Na^+$ will be exchanged for $Na^+$, bringing the $Na^+$ concentration (assuming a slight concentration from evaporation in the reservoirs) to 600 mM—plus a small $Mg^{++}$ concentration (needed for Na,K-pump activity) which will be disregarded in the following calculations.

The inside and outside streams will flow through the first Na,K-pump unit M. The inside stream will flow through the first Na,K-pump unit M. The inside stream has ATP continuously added from an outside source and flows on the side of the membrane M equivalent to the inside of a cell. The outside stream flows on the side of the membrane equivalent to the outside of a cell. Flow of the outside stream is kept adequate to furnish all the $K^+$ necessary to balance ⅔ of the expected $Na^+$ transport. Most of the $Na^+$ from the inside stream is rejected into the outside stream; and the outside stream will have enriched the inside stream with $K^+$ by a molar amount equal to ⅔ the moles of the $Na^+$ transported out. Anions will have moved across the membrane to maintain equivalence to the cations. Added pressure is applied at intervals in the outside stream by the pump P to approximately compensate for the extra osmotic pressure across the membrane from the lower concentrations in the inside stream.

The outside stream is directed to a reservoir anion exchanger $AE_1$ for recovery of $P_i$ (from the ATP hydrolysis), and to be used either to regenerate ion exchangers, to be returned to the sea, or to be otherwise discarded. The inside stream proceeds to a cation exchanger $CE_2$ where its $K^+$ is mostly exchanged for $Na^+$, and to an anion exchanger $AE_2$ to remove ADP for reconversion to ATP. Chemical methods for production of ATP from ADP and $P_i$ are known. At this stage the inside stream is similar to when it entered the first Na,K-pump unit—but with only ⅔ the salt concentration. To continue with desalination of the inside stream, the same sequence of Na,K-pump elimination of $Na^+$ followed by $Na^+$ replacement of $K^+$ through cation exchange $CE_2$ is repeated over and over to continually reduce the stream's ionic content. After 12 such paired treatments, but before the last cation exchange, the $Na^+$ in the inside stream will be about 1 mM and the $K^+$ about 5 mM. At this stage, both $OH^-$-conditioned anion exchanger and $H^+$-conditioned cation exchanger may be used for final deionization, regenerating the respective exchangers with base and acid.

For optimum operation certain conditions such as temperature and chemical concentrations are preferred. These may be regulated by standard procedures.

Using the process described, the total ATP requirement is 0.60 moles to desalinate a liter of water—2270 moles per 1000 gallons. 8.5 watt-hours will theoretically reassemble ADP and $P_i$ into one mole of ATP; so 19.3 kWh would handle the Na,K-pump energy for 1000 gallons of desalinated seawater. With electrical energy at two cents a kWh and 48% efficiency of conversion, the energy would cost $0.80 per 1000 gallons. This does not include pumping, heating, etc., but only the cost of moving ions out of the water to be desalinated.

The energy requirement may be reduced by cation exchange of the outside stream: exchanging all the monovalent cations to $Na^+$—or to cations with charges greater than 1. It has been found that the Na,K-pump will function, although more slowly, under either of those conditions: with the only monovalent cation being $Na^+$ outside the membrane, for every ATP hydrolyzed there are 3 $Na^+$ ions transported out and only "one to two" $Na^+$ ions transported back; with no monovalent cations, for every ATP hydrolyzed there are 3 $Na^+$ transported out and zero cations back.

The energy requirement may be reduced if the ADP-ATP conversion requires less than double the free energy difference. The cost may be reduced if the conversion uses less expensive energy than electricity at $0.02/kWh.

Applications of the process include (1) deionizing solutions other than seawater, (2) bleeding off solutions as desired at different points of the process (e.g., only moderately deionized solutions for some commercial uses), (3) using the process as part of a multi-method system either parallel to or sequential with other methods.

In the process, speed or efficiency may be increased by appropriately modifying either or both of the incoming streams with ion exchange or dilution.

It is possible that some of the high energy phosphates other than ATP, such as the triphosphates of the nucleosides and deoxyribonucleosides (e.g., uridine triphosphate), might similarly to ATP if the appropriate enzyme-transport system were used.

Miscellaneous engineering hardware, including pumps, piping, reservoirs, heaters, instrumentation, and controls should not release certain substances (such as vanadium) to contact the Na,K-pump because of hazards to its activity; this may be controlled with appropriate ion exchangers.

It will be seen that the present invention provides an improved desalination method and means which uses a transport membrane to achieve excellent results, in which the exchange of ions across the membrane is sufficient for the replacement of more ions in one direction than in the other direction, in which the membrane is subject to increased pressure in order to permit more ions to be moved in one direction than in the other direction and in which the combination of a membrane and ion exchangers are used together to achieve excellent results.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A method of desalinating water which comprises the steps of forming a stream of saline water, moving at least a portion of the stream through the inside of a transport membrane, causing ions to be removed from the stream and transporting the ions from the inside to the outside of the membrane, powering said ion transporting with a chemical reaction, said saline water being divided into inside and outside streams, with the inside stream moving through the inside of said membrane and the outside stream moving across the outside of the membrane, and causing ions to cross the membrane in both directions from the inside stream to the outside stream and from the outside stream to the inside stream.

2. A method as set forth in claim 1 wherein more ions are caused to move from the inside stream to the outside stream than are caused to move from the outside stream to the inside stream.

3. A method of desalinating water which comprises the steps of forming a stream of saline water, moving at least a portion of the stream through the inside of a transport membrane, causing ions to be removed from the stream and transporting the ions from the inside to the outside of the membrane, powering said ion transporting with a chemical reaction, dividing said saline water into inside and outside streams, with the inside stream moving through the inside of said membrane and the outside stream moving across the outside of the membrane, ions are caused to cross the membrane from one stream to another, more ions are caused to move from the inside stream to the outside stream than are caused to move from the outside stream to the inside stream, and said ion transporting is powered by an Na,K-pump.

4. A method as set forth in claim 3 wherein said membrane includes $Na^+,K^+$-ATPase.

5. A method as set forth in claim 4 wherein said ion transporting is powered by the hydrolysis of ATP (adenosine 5'-triphosphate) to ADP (adenosine 5'-diphosphate) and $P_i$ (inorganic phosphate).

6. A method as set forth in claim 5 wherein $Na^+$ ions are moved from the inside stream to the outside stream and $K^+$ ions are moved from the outside stream to the inside stream.

7. A method as set forth in claim 6 wherein more $Na^+$ ions move from the inside stream to the outside stream than $K^+$ ions from the outside stream to the inside stream.

8. A method as set forth in claim 7 wherein the said ion transporting is powered by the following reaction:

$3\ Na^+(\text{inside cell}) + 2K^+(\text{outside cell}) + ATP \rightarrow 3\ Na^+(\text{outside cell}) + 2K^+(\text{inside cell}) + ADP + P_i.$ 9. A method as set forth in claim 8 wherein other cations are removed from the inside stream and replaced by $Na^+$ before the stream moves through the membrane.

10. A method as set forth in claim 9 wherein the inside stream is moved through a cation exchanger before the stream moves through the membrane to replace other cations with $Na^+$.

11. A method as set forth in claim 10 wherein ADP in the inside stream is removed and replaced by other anions after the inside stream leaves the membrane.

12. A method as set forth in claim 11 wherein the inside stream moves through an anion exchanger after the stream moves through the membrane to replace ADP with other ions.

13. A method as set forth in claim 12 wherein $K^+$ cations are removed and replaced by $Na^+$ after the inside stream leaves the membrane.

14. A method as set forth in claim 13 wherein the inside stream moves through a cation exchanger after the inside stream leaves the membrane to remove said $K^+$ cations.

15. A mechanism for desalinating water which comprises a transport membrane, means for moving at least a portion of a stream of saline water through the inside of said membrane, means for causing ions to be removed from the stream and transporting the ions from the inside to the outside of the membrane, said means for ion transporting being powered by a chemical reaction, means are provided to divide saline water into inside and outside streams, with the inside stream moving through the inside of said membrane and the outside stream moving across the outside of the membrane, and means to cause ions to cross the membrane in both directions from the inside stream to the outside stream and from the outside stream to the inside stream.

16. A mechanism as set forth in claim 15 wherein more ions move from the inside stream to the outside stream than move from the outside stream to the inside stream.

17. A mechanism for desalinating water which comprises a transport membrane, means for moving at least a portion of a stream of saline water through the inside of said membrane, means for causing ions to be removed from the stream and transporting the ions from the inside to the outside of the membrane, said means for ion transporting being powered by a chemical reaction, means are provided to divide saline water into inside and outside streams, with the inside stream moving through the inside of said membrane and the outside stream moving across the outside of the membrane, ions are caused to cross the membrane from one stream to another, more ions move from the inside stream to the outside stream than move from the outside stream to the inside stream, and said ion transporting is powered by an Na,K-pump.

18. A mechanism as set forth in claim 17 wherein said membrane includes $Na^+,K^+$-ATPase.

19. A mechanism as set forth in claim 18 wherein said ion transporting is powered by the hydrolysis of ATP (adenosine 5'-triphosphate) to ADP (adenosine 5'-diphosphate) and $P_i$ (inorganic phosphate).

20. A mechanism as set forth in claim 19 wherein $Na^+$ ions move from the inside stream to the outside stream and $K^+$ ions move from the outside stream to the inside stream.

21. A mechanism as set forth in claim 20 wherein more $Na^+$ ions move from the inside stream to the outside stream than $K^+$ ions from the outside stream to the inside stream.

22. A mechanism as set forth in claim 21 wherein the said ion transporting is powered by the following reaction:

$$3\text{ Na}^+(\text{inside cell}) + 2\text{K}^+(\text{outside cell}) + \text{ATP} \rightarrow 3\text{Na}^+(\text{outside cell}) + 2\text{K}^+(\text{inside cell}) + \text{ADP} + P_i.$$

23. A mechanism as set forth in claim 22 wherein means are provided to remove other cations from the inside stream and replace them with Na+ before the stream moves through the membrane.

24. A mechanism set forth in claim 23 wherein means are provided to move the inside stream through a cation exchanger before the stream moves through the membrane to replace other cations with Na+.

25. A mechanism set forth in claim 24 wherein means are provided to remove ADP from the inside stream and replace it with other anions after the inside stream leaves the membrane.

26. A mechanism set forth in claim 25 wherein means are provided to move the inside stream through an anion exchanger after the stream moves through the membrane to replace ADP with other ions.

27. A mechanism set forth in claim 26 wherein means are provided to remove K+ cations and replace them with Na+ after the inside stream leaves the membrane.

28. A mechanism set forth in claim 27 wherein means are provided to move the inside stream through a cation exchanger after the inside stream leaves the membrane to remove said K+ cations.

* * * * *